United States Patent [19]
Horikawa

[11] Patent Number: 5,771,086
[45] Date of Patent: Jun. 23, 1998

[54] EYEGLASS BRIDGE HAVING DEFORMATION PREVENTION MEMBERS

[75] Inventor: Kaoru Horikawa, Sabae, Japan

[73] Assignee: Horikawa Co., Ltd., Fukui-ken, Japan

[21] Appl. No.: 662,708

[22] Filed: Jun. 13, 1996

[30] Foreign Application Priority Data

Jun. 16, 1995 [JP] Japan .................................. 7-174107

[51] Int. Cl.$^6$ ..................................................... G02C 5/06
[52] U.S. Cl. ........................................... 351/126; 351/130
[58] Field of Search ..................................... 351/124, 126, 351/129, 130, 133, 152, 154, 68, 69, 65; 2/445

[56] References Cited

U.S. PATENT DOCUMENTS

| | | | |
|---|---|---|---|
| 5,274,404 | 12/1993 | Michael | 351/126 |
| 5,313,671 | 5/1994 | Flory | 351/126 |

FOREIGN PATENT DOCUMENTS 3-26493  6/1991  Japan .

*Primary Examiner*—Huy Mai
*Attorney, Agent, or Firm*—Flynn, Thiel, Boutell & Tanis, P.C.

[57] ABSTRACT

A bridge of rimless glasses is fixed to lenses in a state where it is prevented from being deformed or varied by deformation prevention members, and a fixing portion between the bridge and lenses is not deformed, and hence the fixation at the fixing portion is ensured, thereby enhancing durability. Superelastic metallic material can be directly used by the bridge as the rimless eyeglasses. The bridge of rimless glasses is formed of a superelastic metallic material, and the bridge is fixed to the lenses by way of deformation prevention members. The deformation prevention members have pad arms and fixing bolts fixed thereto. The bolts are inserted into holes bored in the lenses. The pad arms have fitting portions fitted in recesses defined in the lenses. The bridge further comprises lens pads for ensuring fixation to the lenses while bringing into contact with ends of the lenses, fixing bolts to be inserted in holes bored in the lenses, and pad arms fixed to the lens pads, wherein the lens pads and said fixing bolts are fixed to the deformation prevention members.

11 Claims, 8 Drawing Sheets

FIG. I(A)
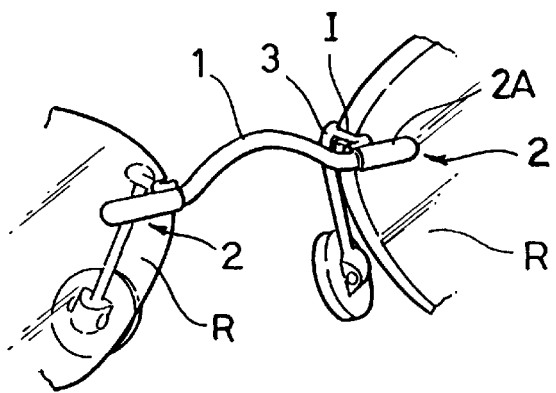
FIG. I(B)
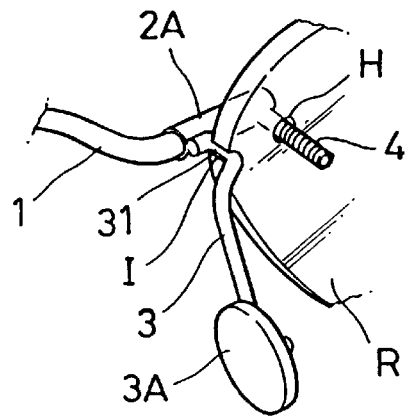
FIG. 2
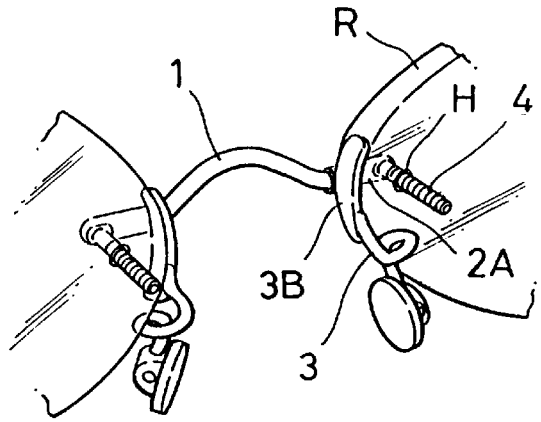

5,771,086

EYEGLASS BRIDGE HAVING DEFORMATION PREVENTION MEMBERS

BACKGROUND OF THE INVENTION

1. Field of the Invention

The present invention relates to a bridge and rimless glasses having the same bridge, more particularly relates to a bridge formed of a superelastic metallic material and rimless eyeglasses having the same bridge.

2. Prior Art

Eyeglasses having excellent function such as fitness and fitting or mounting, and aesthetic appearance have been desired so far.

The eyeglasses have been developed in view of manufacturing technique and their materials, and have been designed to have a good shape. As a result, the eyeglasses which are excellent not only in design but also in function have been recently available in a market.

There are eyeglasses having rim frames for fixing each periphery of lenses and having no rim frame, so-called rimless glasses.

In the eyeglasses using the rim frames, upper half parts or entire peripheries of lenses are surrounded and fixed by the rim frames. The eyeglasses are relatively excellent in strength since the lenses are surrounded by rigidified rim frames.

In this case, components such as temples, brackets and a bridge for connecting both lenses are fixed to the rim frames, wherein the brackets (so-called lugs) fixes the temples to the lenses so as to be turned.

On the other hand, in the rimless glasses, the components such as temples, brackets, the bridge are directly fixed to the lenses since there is no rigidified rim frame to which such components are fixed. Shock resistant eyeglasses have been developed recently. The eyeglasses can sufficiently resist a force strongly applied thereto, and hence they are popular to the young people because they are sporty. Since the recent eyeglasses employ superelastic metallic material for the bridge thereof, they can resist a strong force applied to both rim frames, and hence there has been recently sharp rise in demand for such eyeglasses.

However, such eyeglasses are adapted for those having rim frames and not adapted for those having no rim frames because of the following reasons. That is, since the bridge is directly fixed to the lenses of the rimless eyeglasses, the shock resistance and bending resistance are not obtained at a portion where the bridge is fixed to the lenses corresponding to such resistance of the bridge even if the bridge alone can obtain such resistance owing to superelastic metallic material of the bridge.

Since the bridge formed of superelastic metallic material is largely deformed when stress is applied thereto, if the stress applied to the bridge is directly transmitted to the lenses or the stress applied to the lenses is directly applied to the bridge, a fixing portion between the bridge and the lenses is deformed or varied, and hence the bridge is liable to be loosely fitted to the lenses and finally come off the lenses.

SUMMARY OF THE INVENTION

The present invention has been made to solve the problems of the aforementioned conventional eyeglasses.

It is an object of the present invention to provide a bridge in rimless eyeglasses having high shock resistance and bending resistance.

It is another object of the present invention to provide a bridge in rimless eyeglasses having excellent fixing strength at a portion between the bridge and lenses by employment of superelastic metallic material.

It is still another object of the present invention to provide rimless glasses having a bridge made of superelastic metallic material.

The inventor has devoted himself to solve the problems of the conventional rimless eyeglasses and found the fact that the conventional problems could be solved by providing deformation prevention members on the part where the bridge is fixed to the lenses and rigidified these members. The inventor has completed the present invention based on this fact.

That is, the first aspect of the invention is a bridge of rimless glasses, wherein the bridge is formed of a superelastic metallic material, and the bridge is fixed to lenses by way of deformation prevention members.

The invention also relates to the bridge of rimless glasses wherein the bridge formed of a superelastic metallic material is fixed to lenses by way of deformation prevention members.

The invention also relates to the bridge of rimless glasses wherein pad arms and fixing bolts to be inserted into holes bored in the lenses are fixed to the deformation prevention members.

The invention also relates to the bridge of rimless glasses wherein the deformation prevention members have fitting portions at a part thereof wherein the fitting portions are fitted in recesses defined in the lenses.

The invention also relates to the bridge of rimless glasses further comprising lens pads for ensuring fixation to the lenses while bringing into contact with ends of lenses, fixing bolts to be inserted in holes bored in the lenses, wherein the lens pads and the fixing bolts are fixed to the deformation prevention members.

The invention also relates to the bridge of rimless glasses having pad arms fixed to the lens pads.

The invention also relates to the bridge of rimless glasses wherein the deformation prevention members comprise pipe-shaped bodies through which the bridge is inserted and fixed thereto.

The invention also relates to the bridge of rimless glasses wherein the deformation prevention members comprise plate-shaped bodies which are fixed to the bridge by brazing while the bridge is plated.

The invention also relates to the bridge of rimless glasses wherein the deformation prevention members comprise pads arms tip ends of which are pressed to be flat.

The invention also relates to the rimless glasses having the bridge as set forth above.

Since the bridge of the invention is fixed to the lenses in a state where it is prevented from being deformed or varied by the deformation prevention members, the fixing portion between the bridge and the lenses is not deformed, and hence the fixation at the fixing portion is ensured, thereby enhancing durability.

Superelastic metallic material can be directly used by the bridge in the rimless eyeglasses.

BRIEF DESCRIPTION THE DRAWINGS

FIGS. 1(A–B) are a view of a bridge of rimless glasses according to a first embodiment of the invention, showing a state where a bridge is fixed to lenses, wherein FIG. 1(A)

shows the bridge as viewed from the front thereof and FIG. 1(B) shows the end of the bridge as viewed from the rear thereof;

FIG. 2 is a modification of deformation prevention members in the first embodiment;

FIGS. 4(A–C) show the rimless glasses having the pipe-shaped bodies as the deformation prevention members, wherein

FIGS. 5(A–B) are a view of a bridge of rimless glasses according to a second embodiment of the invention, showing a state where a bridge is fixed to lenses wherein

FIGS. 8(A–B) are a view of a bridge of rimless glasses according to a third embodiment of the invention, showing a state where a bridge is fixed to lenses wherein

PREFERRED EMBODIMENT OF THE INVENTION

First Embodiment (FIGS. 1 to 4)

Figure 3A:
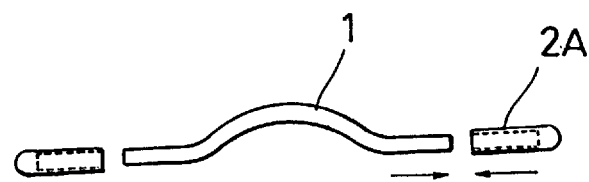
FIGS. 3(A–C) are a view showing procedures for fixing each component to the bridge according to the first embodiment.
Figure 3B:
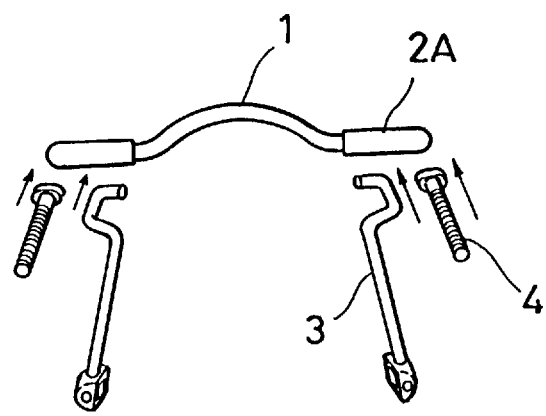

FIG. 1 shows a first embodiment. In a state where a bridge 1 is fixed to lenses R, FIG. 1(A) shows the bridge as viewed from the front thereof and FIG. 1(B) shows the end of the bridge as viewed from the rear thereof.

The bridge 1 is formed of a superelastic metallic material such as nickel titanium alloy, β-titanium alloy, or the like.

Deformation prevention members 2 are fixed to both ends of the bridge 1 and they are made of material other than the superelastic metallic material such as German silver (alloy of Ni-Cu-Zn), Monel metal (alloy of Ni-Cu-Fe), high-Ni alloy (alloy of N-Cr-Cu), or stainless steel. Since such metallic material is not bent even if a slight strong force is applied thereto, namely, since it is rigidified, it can be stably fixed to the lenses. In the first embodiment, the deformation prevention members 2 comprise pipe-shaped bodies 2A. The pipe-shaped bodies 2A are fixed to the bridge 1 when the latter is inserted into and brought into contact with the former so that the bridge 1 is fastened by and engaged into the pipe-shaped bodies 2A. Pad arms 3 each having a nose pad 3A are fixed to the pipe-shaped bodies 2A by brazing, welding, etc.

Further, fixing bolts 4 to be inserted into through holes H of lenses R are fixed to the pipe-shaped bodies 2A by brazing, welding, etc.

After the fixing bolts 4 are inserted into the lenses R, they are screwed into nuts (not shown), etc., at the opposite side, thereby ensuring the fixation to the lenses R.

In the first embodiment, recesses I are defined in the end surfaces of the lenses R and each part of the pad arms 3 (fitting parts 31) is fitted into the recesses I. Accordingly, the lenses R are surely fixed by the fixing bolts 4 which are inserted into the through holes H bored in the lenses R and the pad arms 3 which are fitted at the part thereof in the recesses I defined in the end surfaces thereof without being turned or jolted.

FIG. 2 shows another example or modification for preventing turning or jolting of the lenses R. Lens pads 3B are provided on the pipe-shaped bodies 2A for preventing the lenses R from being turned so as to fix the lenses R surely, and they are pressed onto the end surfaces of the lenses R. The pad arms 3 are fixed to the lens pads 3B. Accordingly, the lenses R are surely fixed by the fixing bolts 4 which are inserted into the through holes H and the pad arms 3 which are fitted at the part thereof in the recesses I defined in the end surfaces thereof without being turned or jolted.

The procedures for fixing the pad arms 3 and the fixing bolts 4 to the bridge 1 will be now described with reference to FIG. 3.

Firstly, the bridge 1 is inserted into the pipe-shaped bodies 2A as the deformation prevention members 2 at both ends thereof, and hence the bridge is pressed from the outside so that the bridge is fastened by and engaged into the pipe-shaped bodies (see to FIG. 3(A)). Since the bridge 1 is covered cylindrically with the pipe-shaped bodies 2A, the bridge 1 is strong in strength and rigidified, and hence the bridge 1 is prevented from being varied or deformed at these parts.

Secondly, the fixing bolts 4 are fixed to the pipe-shaped bodies 2A by welding, brazing, etc. (see FIG. 3(B)).

Thirdly, the pad arms 3 are fixed to the pipe-shaped bodies 2A by welding, brazing, etc. (see FIG. 3(B)).

Figure 3C:
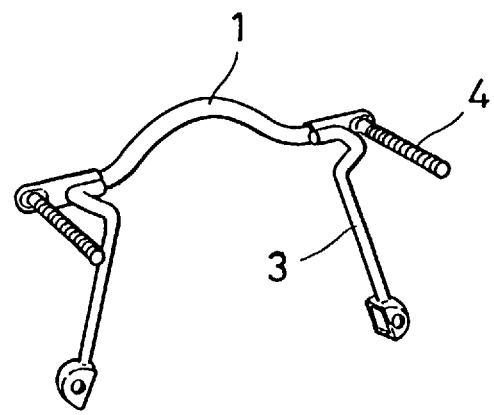

Fourthly, after the fixing bolts 4 and the pad arms 3 are fixed to the pipe-shaped bodies 2A, the pipe-shaped bodies 2A are more reinforced and rigidified (see FIG. 3(C)).

The procedures are completed with the aforementioned four steps.

Figure 4A:
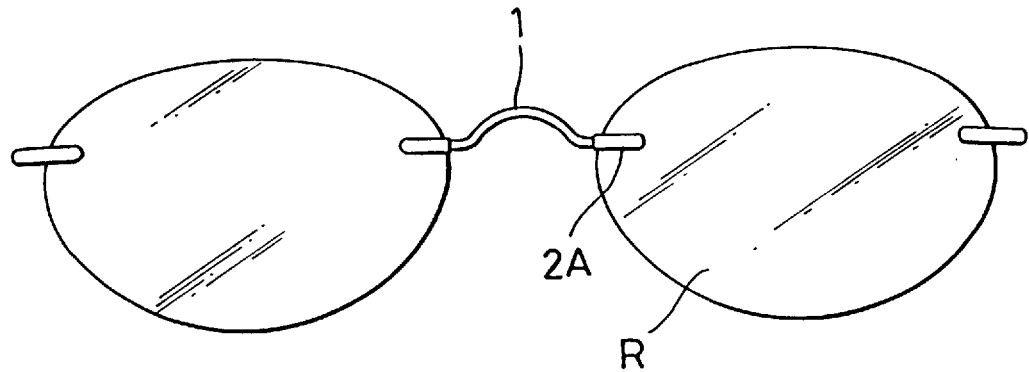
FIG. 4(A) is a front view.
Figure 4B:
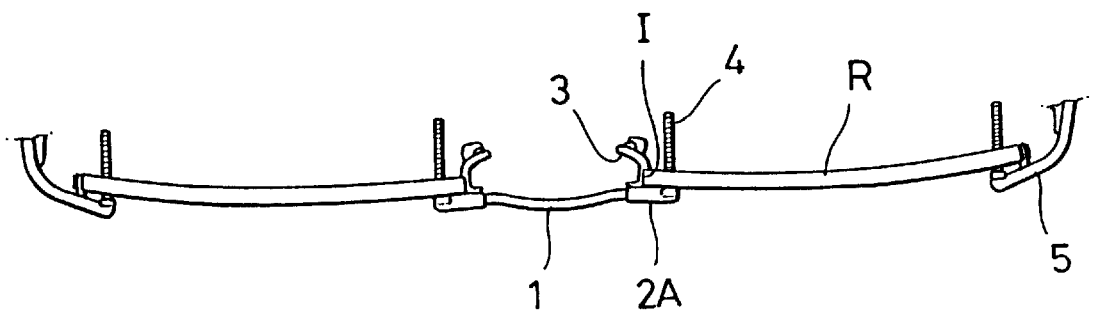
FIG. 4(B) is a plan view and FIG. 4(C) is a side view.
Figure 4C:
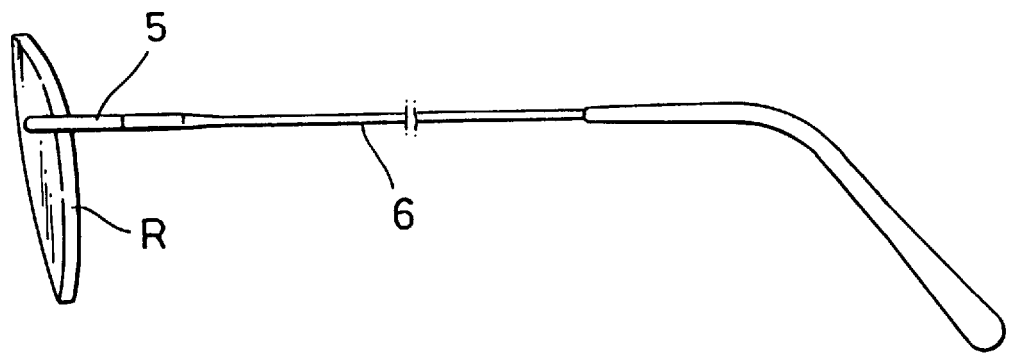

FIG. 4 shows the rimless glasses having the pipe-shaped bodies 2A as the deformation prevention members 2, wherein FIG. 4(A) is a front view, FIG. 4(B) is a plan view and FIG. 4(C) is a side view.

Figure 5A:
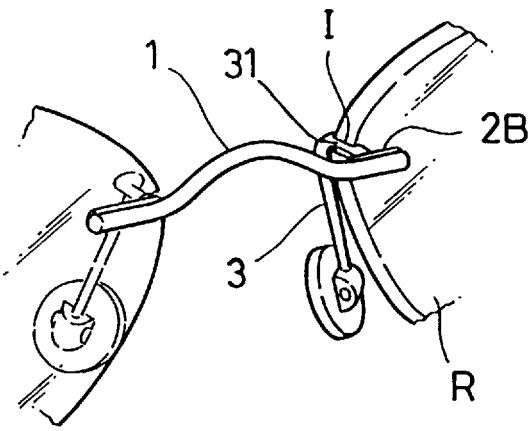
FIG. 5(A) shows the bridge as viewed from the front thereof and FIG. 5(B) shows the end of the bridge as viewed from the rear thereof.
Figure 5B:
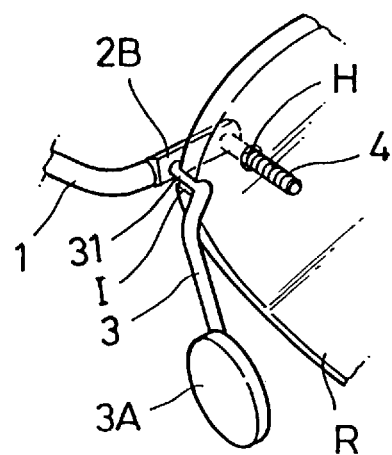

Second Embodiment (FIG. 5)

FIG. 5 shows a second embodiment of the invention. In a state where the bridge 1 is fixed to the lenses R, FIG. 5(A) shows the bridge as viewed from the front thereof and FIG. 1(B) shows the end of the bridge as viewed from the rear thereof.

The bridge 1 is formed of a superelastic metallic material same as the first embodiment. Deformation prevention members 2 are made of material other than the superelastic metallic material and are fixed to both ends of the bridge 1 in the same way as the first embodiment. In the second embodiment, the deformation prevention members 2 comprise plate-shaped bodies 2B.

The plate-shaped bodies 2B are brought into contact with the bridge 1 so that the former is fixed to the bridge 1 by brazing. When the bridge 1 is made of superelastic metallic material, the plate-shaped bodies 2B are difficult to be fixed to the bridge 1 by brazing, and hence the bridge is subjected to plating, e.g. it is plated with nickel, then the plate-shaped bodies 2B are fixed to the bridge 1 by brazing. At this time, the surfaces of the plate-shaped bodies 2B which are brought into contact with the bridge 1 are preferable to be curved in accordance with the curvature of the bridge 1 so as to be strongly fixed to the bridge 1. Pad arms 3 each having the nose pad 3A are fixed to the plate-shaped bodies 2B by brazing, welding, etc.

Further, the fixing bolts 4 to be inserted into through holes H of the lenses R are fixed to the plate-shaped bodies 2B by brazing, welding, etc.

After the fixing bolts 4 are inserted into the lenses R, they are screwed into nuts (not shown), etc., at the opposite side, thereby ensuring the fixation to the lenses R.

In the second embodiment, the recesses I are defined in the end surfaces of the lenses R and each part of the pad arms 3 (fitting parts 31) are fitted into the recesses I in the same manner as the first embodiment. Accordingly, the lenses R are surely fixed by the fixing bolts 4 and the pad arms 3 in the same manner as the first embodiment.

In the second embodiment, in the same manner as the first embodiment shown in FIG. 2, lens pads, not shown, are provided on the plate-shaped bodies 2B for preventing the lenses R from being turned so as to fix the lenses R surely, and they are pressed onto the end surfaces of the lenses R. As a result, it is needless to say that the lenses are prevented from being turned or jolted.

Figure 6A:
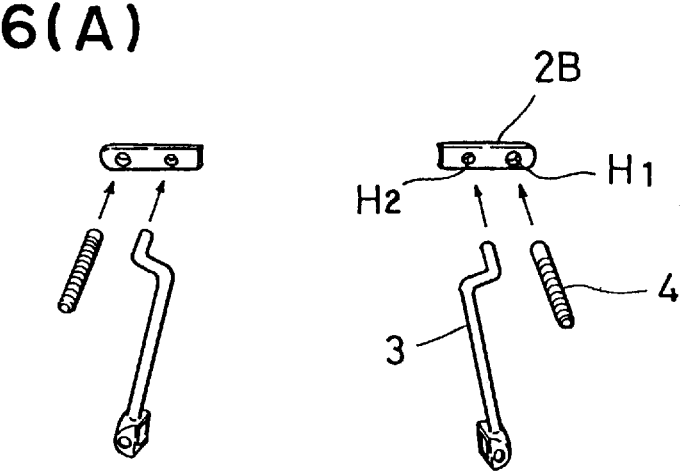
FIGS. 6(A–C) are a view showing procedures for fixing each component to the bridge according to the second embodiment.
Figure 6B:
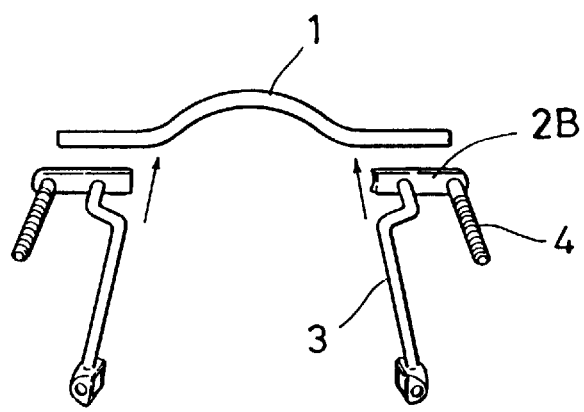

The procedures for fixing the pad arms 3 and the fixing bolts 4 to the bridge 1 will be now described with reference to FIG. 6.

Firstly, the fixing bolts 4 are fixed to the plate-shaped bodies 2B as the deformation prevention members 2 by welding, brazing, etc. (see FIG. 6(A)).

Since the plate-shaped bodies 2B are aligned with the bridge 1, the bridge 1 at these portions is reinforced, and hence the bridge 1 is rigidified and is prevented from being varied or deformed. In this case, the holes Hi are bored in the plate-shaped bodies 2B in advance, and the tip ends of the fixing bolts 4 are fitted in these holes H1 and they are subjected to the welding, brazing, etc. so that the fixing bolts 4 are fixed to the plate-shaped bodies 2B in suitable strength.

Secondly, the pad arms 3 are fixed to the plate-shaped bodies 2B by welding, brazing, etc. (see FIG. 6(A)).

Also in this case, holes H2 are bored in the plate-shaped bodies 2B in advance, and it is preferable that the tip ends of the pad arms 3 are fitted in these holes H2.

Thirdly, the plate-shaped bodies 2B to which the pad arms 3 and the fixing bolts 4 are fixed are brought into contact with both ends of the bridge 1, then the portions where they contact one another are subject to welding, brazing, etc. (see FIG. 6(B)).

Since the bridge 1 is made of a superelastic metallic material, the plate-shaped bodies 2B are difficult to be fixed to the bridge 1 by brazing, and hence the bridge is subjected to plating, e.g. it is plated with nickel, then the plate-shaped bodies 2B are fixed to the bridge 1 by brazing.

Since the bridge 1 is made of superelastic metallic material, the portions where the bridge 1 and the plate-shaped bodies 2B are subjected to the special welding, but it is not an essence of the invention, and hence the explanation thereof is omitted. At this time, the surfaces of the plate-shaped bodies 2B contacting the bridge 1 are preferable to be curved so that the plate-shaped bodies 2B can be strongly fixed to the bridge 1.

Figure 6C:
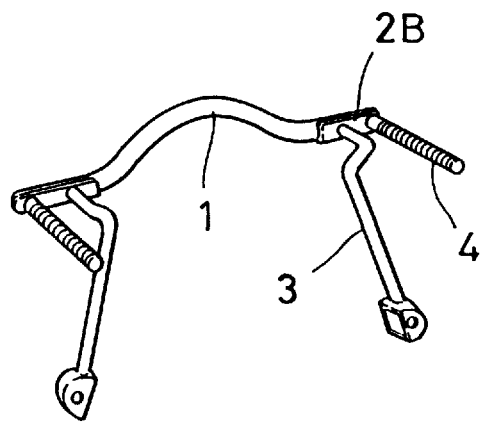

Fourthly, after the fixing bolts 4 and the pad arms 3 are fixed to the plate-shaped bodies 2, the plate-shaped bodies 2B are more reinforced and rigidified (see FIG. 6(C)).

The procedures are completed with the aforementioned four steps.

Figure 7:
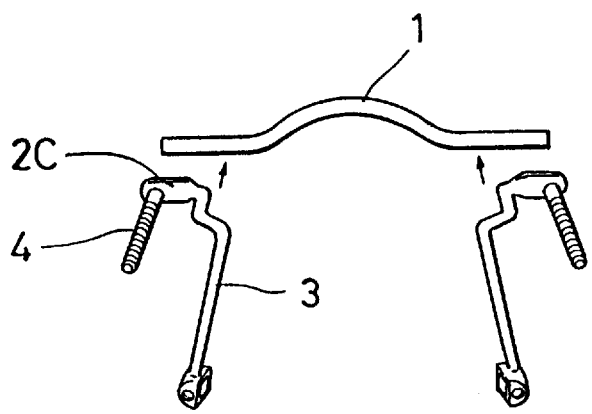
FIG. 7 is a view showing a modification of deformation prevention members according to the second embodiment wherein tip ends thereof are made flat.

FIG. 7 shows another example or modification of the deformation prevention members 2 in the second embodiment. The deformation prevention members 2 are made flat by pressing the tip ends of the pad arms by a plasticizing process.

The fixing bolts 4 are fixed to the flat portion 2C by welding, brazing, etc.

Third Embodiment (FIG. 8)

Figure 8A:
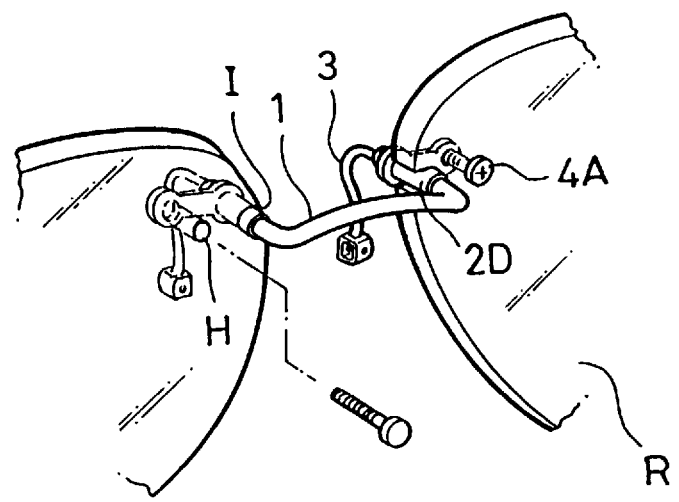
FIG. 8(A) shows the bridge as viewed from the front thereof and FIG. 8(B) shows the end of the bridge as viewed from the rear thereof.
Figure 8B:
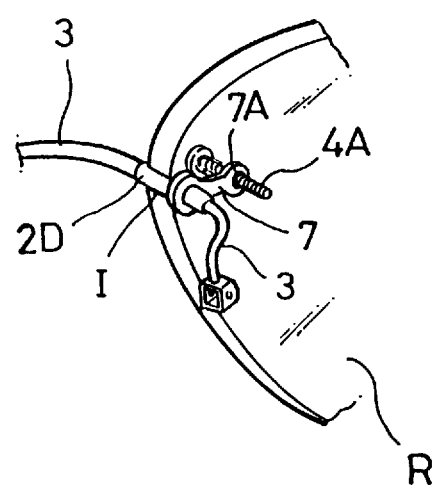

FIG. 8 shows a third embodiment. In a state where the bridge 1 is fixed to the lenses R, FIG. 8(A) shows the bridge as viewed from the front thereof and FIG. 8(B) shows the end of the bridge as viewed from the rear thereof.

The bridge 1 is formed of a superelastic metallic material in the same manner as the first and second embodiments.

The deformation prevention members 2 are fixed to both ends of the bridge 1 and made of material other than the superelastic metallic material. In the third embodiment, the deformation prevention members 2 comprise hollow bodies 2D. The hollow bodies 2D are fixed to the bridge 1 when the latter is inserted into and brought into contact with the former so that the bridge 1 is fastened by and engaged into the hollow bodies 2D. Pad arms 3 each having a nose pad (omitted) are fixed to the ends of the hollow bodies 2D by brazing, welding, etc. The pad arms 3 may be integrated with the hollow bodies 2D by extending the ends of the hollow bodies 2D. Further, rib members 7, which contact the surfaces of the lenses R, are fixed to the hollow bodies 2D by brazing, welding, etc.

Holes 7A are bored in the rib members 7 so as to insert bolts 4A therethrough. The bolts 4A are inserted into the holes 7A and the through holes H of the lenses R, and they are fastened by nuts, not shown, at the opposite side so that the bridge 1 is fixed to the lenses R.

The recesses I are defined in the end surfaces of the lenses R and parts of the pad arms 3 are fitted into the recesses I. Accordingly, the lenses R are surely fixed by the bolts 4A which are inserted into the through holes H and the hollow bodies 2D fitted at each part thereof in the recesses I defined in the end surfaces thereof without being turned or jolted.

Figure 9A:
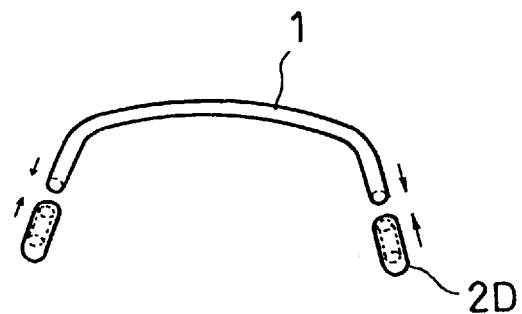
FIGS. 9(A–C) are a view showing procedures for fixing each component to the bridge according to the third embodiment.
Figure 9B:
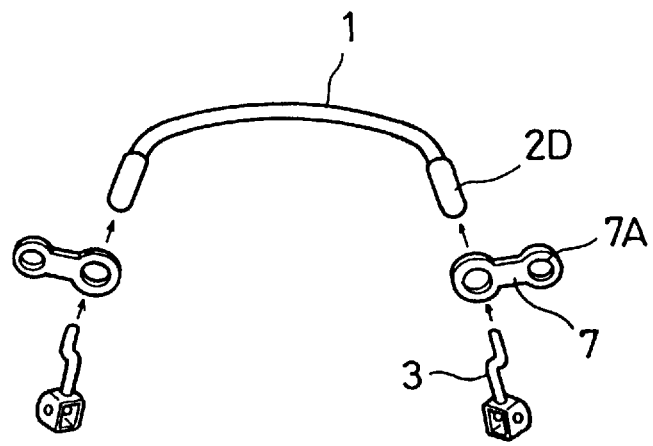

The procedures for fixing deformation prevention members 2, the pad arms 3 and the rib members 7 to the bridge 1 will be now described with reference to FIG. 9.

Firstly, both bent ends of the bridge 1 are inserted into the hollow bodies 2D as the deformation prevention members 2, so that the bridge 1 is fastened by and engaged into the hollow bodies 2D since it is pressed from outside (see FIG. 9A)). Since the bridge 1 is covered cylindrically with the hollow bodies 2D, it is strong in strength and rigidified, and hence the bridge 1 is prevented from being varied or deformed at these parts.

Secondly, the rib members 7 are inserted into and fixed to the hollow bodies 2D by welding, brazing, etc. (see FIG. 9(B)).

Thirdly, the pad arms 3 are fixed to both ends of the hollow bodies 2D by welding, brazing, etc. (see FIG. 9(B)).

Figure 9C:
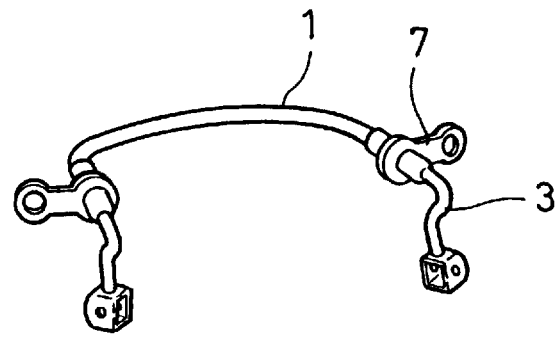

Fourthly, after the rib members 7 and the pad arms 3 are fixed to the hollow bodies 2D, the hollow bodies 2D are more reinforced and rigidified (see FIG. 9(C)).

The procedures are completed with the aforementioned four steps.

If the hollow bodies 2D are integrally formed with the pad arms 3 in advance, the above mentioned third step is omitted.

Figure 10A:
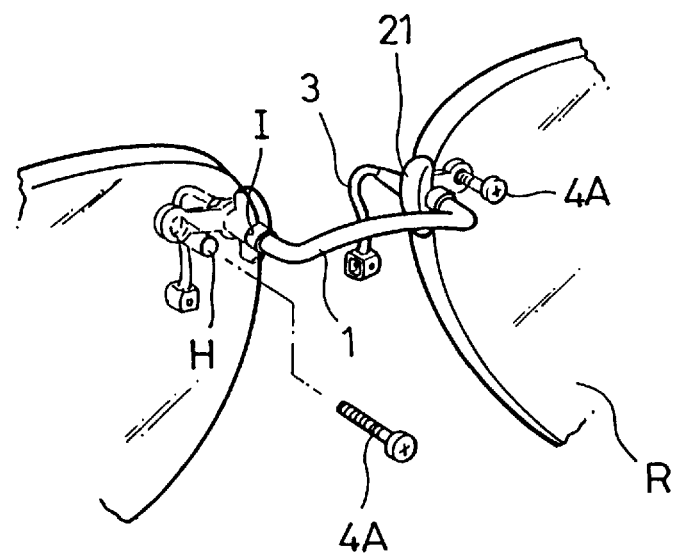
FIGS. 10(A–B) are a view showing a modification of deformation prevention members according to the third embodiment.
Figure 10B:
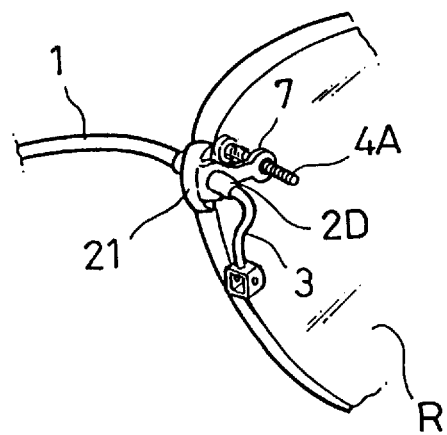

FIG. 10 shows another modification of the deformation prevention members 2 in the third embodiment. In this case, lens pads 21 are fixed to the hollow bodies 2D by brazing, welding, etc., for surely preventing the lenses R from being turned or jolted. The lens pads 21 are fitted onto the end surfaces of the lenses R so as to surely fix the lenses R.

The procedures for fixing the deformation prevention members 2 (hollow bodies 2D), the pad arms 3, the rib members 7, the lens pads 21 to the bridge 1 are performed by fixing the lens pads 21 to the hollow bodies 2D by welding, brazing, etc. after the fixation of the rib members 7 as shown in FIG. 9.

If the hollow bodies 2D to which the lens pads 21 are integrally fixed in advance are used, the procedures may be the same as those shown in FIG. 9.

Although the present invention is explained with reference to the first to third embodiments, it is needles to say that the present invention is not limited thereto but can be modified variously without departing from the essence or scope of the present invention. For example, there are following modifications.

The shapes of the pad arms 3 and lens pads and the shape of the rib members 7 may be varied.

The shape of the rib members 7 is not limited to that as explained in the third embodiment if the rib members 7 can receive the force to be applied to the bridge 1 as the rigid body and they are so strong that they are not deformed when they are fixed to the lenses R.

With the arrangement of the bridge of the present invention, even if the force is applied to the bridge, the deformation prevention members 2 are not deformed at the portion where they are fixed to the bridge, so that it is possible to keep the lenses R fixed strongly. The rimless eyeglasses having this bridge are strong against the shock and bending, thereby achieving high durability.

What is claimed is:

1. Eyeglasses comprising first and second lenses and a bridge joining said two lenses, said bridge having an elongate superelastic metallic member and first and second deformation prevention members, said first and second deformation prevention members being respectively fixed to first and second ends of said superelastic metallic member and respectively secured to said first and second lenses.

2. The eyeglasses according to claim 1, wherein end surfaces of said two lenses each have a recess therein, first and second pad-arms are respectively fixed to said first and second deformation prevention members and each of said pad-arms are partially received in a respective recess.

3. The eyeglasses according to claim 2, wherein said first and second deformation prevention members respectively contact a surface of said first and second lenses.

4. The eyeglasses according to claim 1, wherein both said deformation prevention members have a hollow pipe shape and fixedly receive an end of said superelastic metallic member therein.

5. The eyeglasses according to claim 1, wherein said first and second lenses have holes therein, fixation members extend outwardly from said first and second deformation prevention members and said holes receive said fixation members to secure said first and second deformation prevention members to said first and second lenses respectively.

6. The rimless eyeglasses according to claim 5, wherein first and second pad-arms are fixed to an end of respective first and second deformation prevention members.

7. The rimless eyeglasses according to claim 5, wherein said first and second deformation prevention members have a hollow pipe shape and receive an end of said bridge therein.

8. The rimless eyeglasses according to claim 5, wherein first and second lens pads are respectively fixed to said first and second deformation prevention members and cover said recesses receiving said deformation prevention members.

9. Rimless eyeglasses comprising first and second lenses, a bridge joining said two lenses, and first and second deformation prevention members receiving and being respectively fixed to first and second ends of said bridge, said bridge being a superelastic metallic member, said first and second lenses each having a recess, and said first and second deformation prevention members being fixed to said first and second lenses respectively and being fitted in the respective recesses.

10. The rimless eyeglasses according to claim 9, wherein a rib member extends outwardly and is fixed to said first deformation prevention member and a bolt secures said rib member to said first lens.

11. The rimless eyeglasses according to claim 10, wherein a second rib member extends outwardly and is fixed to said second deformation prevention member and a bolt secures said second rib member to said second lens.

* * * * *